Aug. 12, 1958 — J. L. HOBIN — 2,846,881
THERMOMETER CONSTRUCTION
Filed Feb. 16, 1955 — 2 Sheets-Sheet 1

INVENTOR
JOHN L. HOBIN

Strauch, Nolan & Diggins
ATTORNEYS

Aug. 12, 1958 J. L. HOBIN 2,846,881
THERMOMETER CONSTRUCTION
Filed Feb. 16, 1955 2 Sheets-Sheet 2
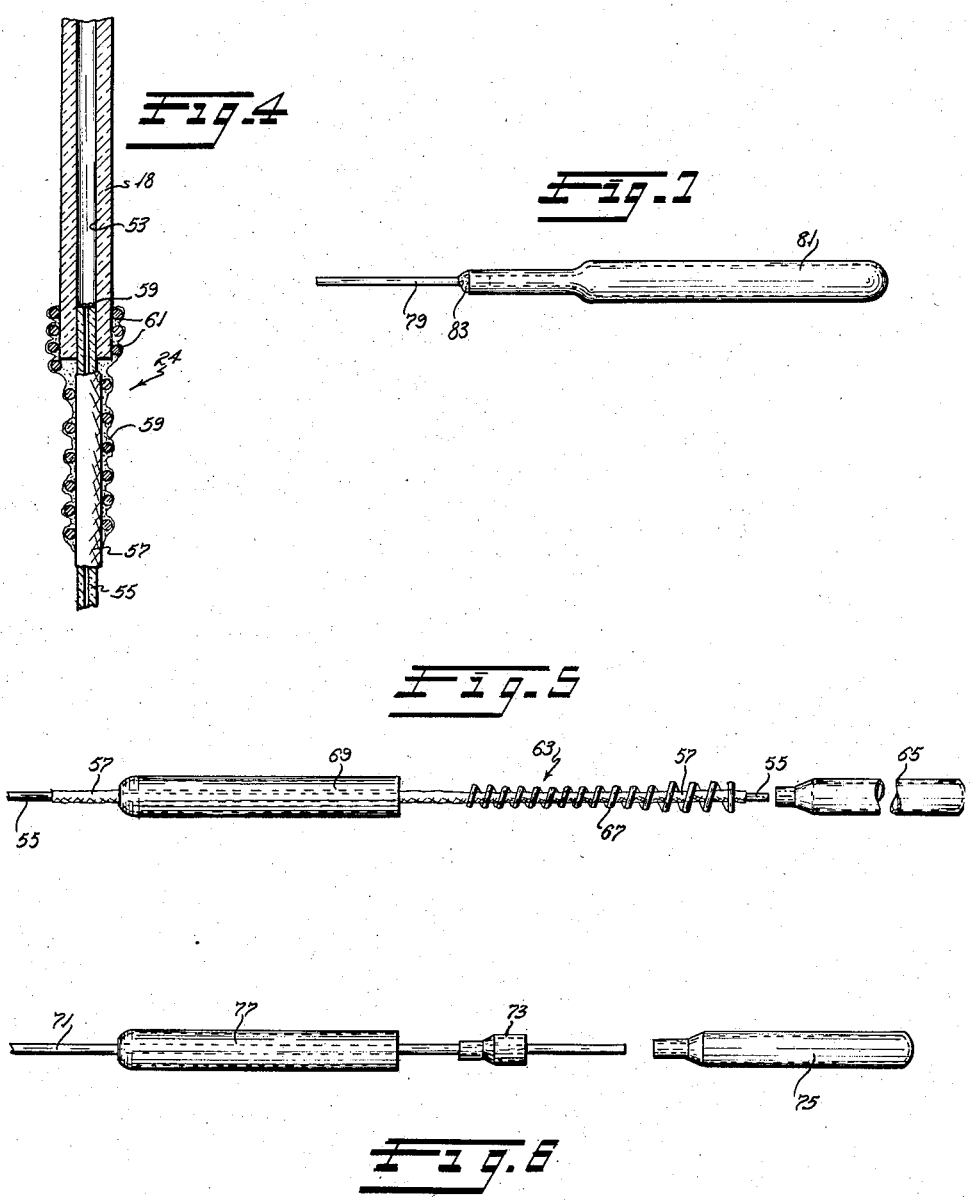
INVENTOR
JOHN L. HOBIN
BY Strauch, Nolan + Diggins
ATTORNEYS

United States Patent Office 2,846,881
Patented Aug. 12, 1958

2,846,881

THERMOMETER CONSTRUCTION

John L. Hobin, Springfield, Ohio, assignor to Thermometer Corporation of America, Springfield, Ohio, a corporation of Ohio Application February 16, 1955, Serial No. 488,450

10 Claims. (Cl. 73—340)

This invention relates to temperature measuring devices and more particularly to improvements in indoor-outdoor and other plural temperature thermometers, and to improved constructions of remote reading thermometer elements.

The prior art includes many plural temperature thermometers of widely varying construction suitable for indoor-outdoor and other plural and remote temperature indication. Certain of these known constructions utilize a thermometer element of conventional integral stem and bulb type for indicating indoor temperatures and, for outdoor temperature indication, employ a remote reading thermometer element made up of a glass stem positioned adjacent the indoor thermometer element and interconnected as by a length of metal capillary tubing to a remotely disposed liquid-filled bulb located for exposure to outdoor temperatures. While some of the prior indoor-outdoor thermometers of this type have proven generally satisfactory in many applications, all are subject to certain disadvantages commonly including difficulty and high cost of manufacture, poor accuracy of measurement, difficulty of reading and relatively short service life.

The present invention is directed to thermometers of the foregoing general types and to remote reading thermometer elements therefor, and has as its principal object the provision of new and improved thermometer constructions which are free of the above enumerated and other disadvantages of prior constructions as will be more fully explained hereinafter.

Perhaps the most troublesome difficulty encountered in the production of the most pertinent remote reading thermometer elements by methods heretofore used resides in sealing the bendable capillary tubing, which generally is of metal, to the glass stem of the thermometer. The conventional method of effecting this seal includes the steps of counterboring or otherwise enlarging the bore of the glass stem at one end, metallizing the enlarged portion of the bore and then soldering or brazing the metal tube into the metallized bore, all of which operations are relatively difficult, time-consuming and costly. Moreover, the difference in coefficients of thermal expansion of the glass stem and metal tubing frequently cause breakage of the seal between the stem and tubing and occasionally of the glass stem itself.

I have found that these difficulties may be obviated and wholly satisfactory seals within normal ambient temperature variation between the glass stems and metal tubing of remote reading thermometer elements obtained readily, uniformly and at minimum unit cost by use of settable plastic bonding agents as hereinafter more specifically described for sealing the tubing into the stem bores. By glass to metal sealing in this manner, the need for costly metallizing and brazing apparatus as necessary to prior constructions is entirely avoided, as is the need for skilled artisans such as required for the production of stem and tubing seals by methods heretofore employed.

Settable plastic bonding agents when utilized in accordance with the invention and particularly when fortified by inclusion of frits or similar inorganic fillers as hereinafter explained provide perfectly liquid tight seals having more than adequate mechanical strength to withstand normal abuse at all normal ambient atmospheric temperature and humidity conditions encountered in normal service use. While the layer of plastic sealant between the stem bore and the inserted tubing hardens almost to ceramic consistency and provides a connection between elements which to all appearances is perfectly rigid, still it retains sufficient elasticity to readily compensate the difference in coefficients of thermal expansion of the glass stem and metal tubing. Thus the possibility of breakage of the glass stem or of its seal to the tubing with expansion and contraction due to temperature change is minimized in the thermometer constructions of the present invention, assuring long and trouble-free service life.

Accordingly, it is a further object of the invention to provide new and improved remote reading thermometer elements wherein settable plastic bonding agents are utilized in forming glass-to-metal seals.

More specifically, it is an object of the invention to provide novel remote reading thermometer elements each comprising a length of bendable metal tubing sealed at one or both ends into a glass thermometer stem and/or bulb by settable plastic bonding agents which may if desired include a frit or similar inorganic filler material for enhancing the strength of the glass-to-metal bond obtained.

I have found that the ease and economy with which glass to metal seals may be effected in accordance with the invention and the quality of the seals thus produced permits making the temperature sensing bulb of the remote reading (outdoor) thermometer of glass rather than of metal as has heretofore generally been the practice because of economic reasons. This is of particular advantage in that glass bulbs provide much better accuracy and reproducibility of temperature reading, due primarily to their constancy of volumetric capacity at different temperatures, present and past. Metal bulbs do offer the advantages of good resistance to breakage and quicker response to temperature change, but if desired these advantages may be retained in the temperature sensing bulbs of this invention by enclosing the glass bulbs within a protective sheath or capsule of heat conductive metal or the like.

It is accordingly another object of the invention to provide new and improved remote reading thermometer elements wherein the remotely disposed temperature sensing bulbs are of glass. Still another object is the provision of such thermometer elements wherein the glass bulbs are enclosed within protective and heat conductive metal sheaths.

Indoor-outdoor thermometers have previously been suggested wherein both the indoor and outdoor thermometer elements read on a single scale, one such thermometer being disclosed in United States Patent No. 1,081,139 to Parliman, for example. The indoor-outdoor thermometers of the present invention are of this general type and preferably have but a single scale of temperature indicia for both thermometer elements, the indoor and outdoor elements being made of equal sensitivities so both will properly read on this single scale by selecting an outdoor thermometer tube having a bore diameter relatively larger than that of the indoor tube an amount corresponding to the difference in volumetric capacities of the indoor and outdoor temperature sensing bulbs. The uniformly large bore thus provided in the outdoor thermometer stem also is of advantage in permitting direct insertion of the associated capillary tubing into the bore without first counterboring or otherwise enlarging the bore end in which the tubing is received, thus effecting substantial manufacturing economies. Still another advantage resides in the better visibility of the temperature sensitive liquid column in the tube, the wider bore thereof providing a broader and more easily observed liquid column. At the same time, the greater width of the liquid column renders it unimportant that any magnifying system embodied in the instrument be accurately aligned with the outdoor thermometer tube, it being only necessary that the magnifying system be properly aligned with respect to the indoor thermometer tube which may have the usual small-diameter bore.

This magnifying system constitutes an improvement over that disclosed in U. S. Patent No. 2,460,051 to Welch and preferably includes lateral magnifying elements formed integrally with the thermometer tubes and a pair of lateral magnifying strips integrally formed in a transparent plastic housing in which the tubes are mounted, this housing presenting other novel features of construction providing particular ease and economy of manufacture and other advantages which will be fully described hereinafter.

Accordingly, it is a further object of the invention to provide new and improved remote reading thermometer elements including a thermometer stem, remote temperature sensing bulb and connecting capillary tubing, the thermometer stem having an enlarged bore of uniform diameter throughout the length thereof.

It is also an object to provide such a thermometer element wherein the diameter of the stem bore is such that the capillary tubing may be directly received therein.

Another object of the invention is the provision of novel indoor-outdoor thermometers wherein the sensitivities of the indoor and outdoor thermometers are such that both may accurately read on a single scale despite differences in volumetric capacities of their respective temperature sensing bulb assemblies.

Still another object is the provision of new and improved magnifying systems for indoor-outdoor and other thermometers, and novel housings for such thermometers.

These and other objects, features and advantages of the invention will become more fully apparent by reference to the appended claims and the following detailed description when read in conjunction with the accompanying drawings, wherein:

Figure 4 is an enlarged sectional view of the remote reading (outdoor) thermometer stem and metal tubing assembly showing one form of interconnection of the stem and tubing;

Figure 5 is an exploded view showing one form of attachment of metal tubing to a glass temperature responsive bulb;

Figure 6 is an exploded view showing an alternative form of metal tubing and attachment to the thermometer stem or temperature responsive bulb; and Figure 7 is a detail view showing a modified form of remote reading thermometer element utilizing a metallic temperature sensing bulb.

Figures 1, 2, 3:
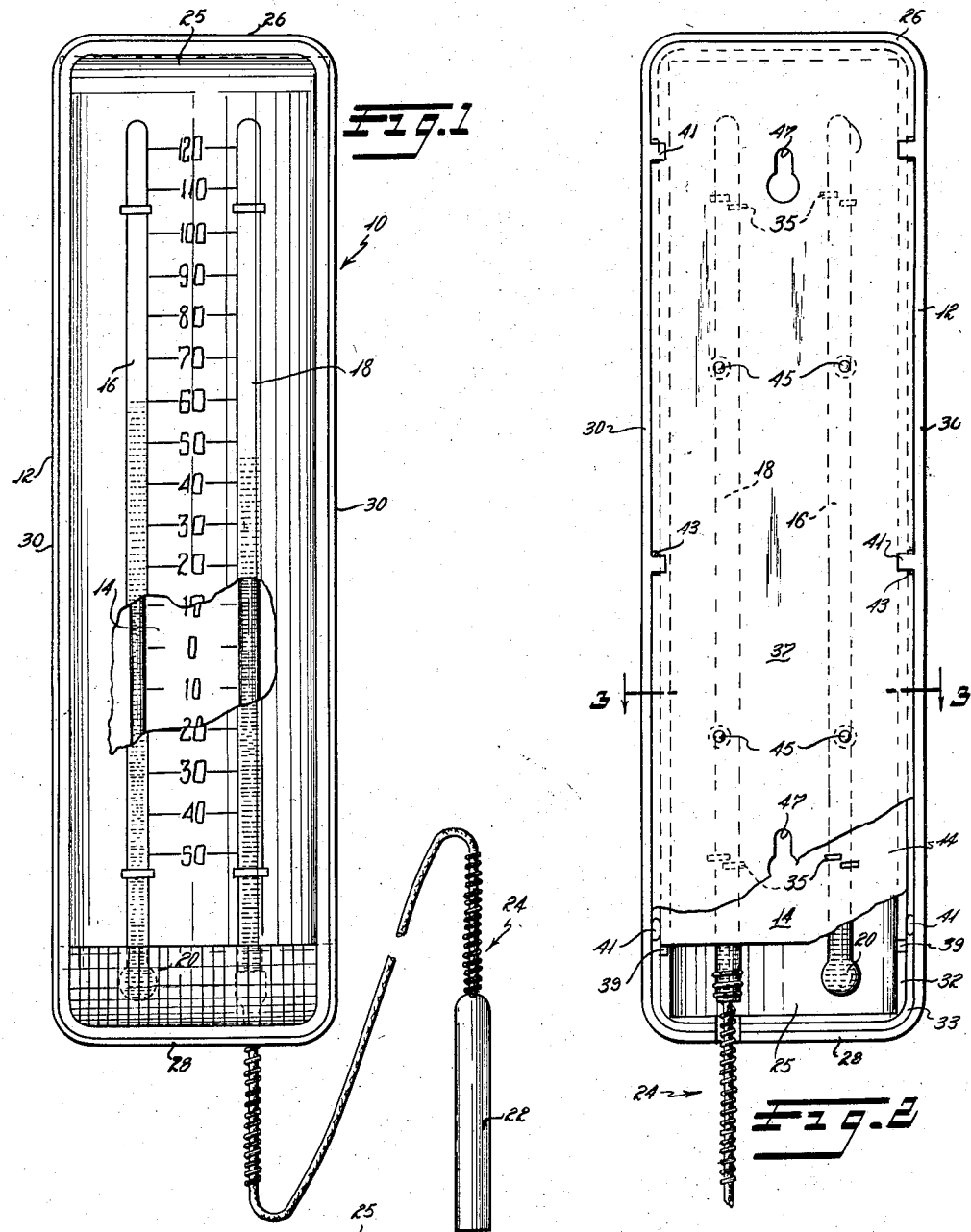
Figure 1 is a front elevation of an indoor-outdoor thermometer embodying one form of the invention.
Figure 2 is a rear elevation of the thermometer of Figure 1 with portions of the casing back plate and thermometer card broken away to show details of housing construction.
Figure 3 is an enlarged sectional view on line 3—3 of Figure 2.

With continued reference to the drawings, wherein like reference numerals are used throughout to designate like elements, the indoor-outdoor temperature thermometer selected for illustration constitutes one form of plural temperature thermometer embodying the invention. This thermometer, generally designated by reference numeral 10 in Figures 1 and 2, may comprise an elongated housing 12 enclosing a thermometer card 14 on which are printed or otherwise inscribed suitable temperature graduations as shown between the stems 16 and 18 of the indoor and outdoor thermometer elements, respectively, thermometer stem 16 being provided with an integral glass bulb 20 and the stem 18 with a remotely located bulb 22 connected into the stem as by a length of flexible metal capillary tubing 24.

The front wall 25 of housing 12 preferably is formed of a transparent plastic such as Lucite or other suitable molded plastic composition. Formed integrally with housing front wall 25 or otherwise secured thereto are rearwardly extending top, bottom and side walls 26, 28 and 30, respectively, which may be of the same plastic material as front wall 25 and should be thermoplastic or otherwise deformable for a reason which will later become apparent. As illustrated in Figures 2 and 3, each of these walls has formed in the inwardly facing side thereof stepped inner and outer shoulders or lands 32 and 33, respectively, preferably extending over the entire periphery of the chamber or recess defined by the housing walls. Thermometer card 14, to which the two thermometer tubes 16 and 18 may be attached as by staples 35, cementing or other suitable means, seats on the inner shoulders 32 of housing 12 and is held firmly pressed against this shoulder by a housing closure or back plate 37 as will later be described. Card 14 at its lower end terminates short of the bottom wall 28 of housing 12 and is held against displacement toward the lower end of the housing by one or more integrally formed ribs or projections 39 upstanding from the shoulder 32 and engaging the lower end of the card as shown.

Back plate 37 fits snugly within housing 12 with its periphery seated on the outer shoulder 33 formed in the housing walls, the back plate being firmly held in position against this shoulder 33 as by a plurality of tabs 41 which preferably are formed integrally with the thermoplastic material of the housing walls and which extend rearwardly from shoulders 33 thereof through slots 43 provided in the periphery of the back plate. Initially, these tabs are straight and extend directly rearwardly of the housing as shown at 44 in Figure 3. During assembly the tabs 41 are softened as by heating and then bent over and onto the back plate to fix it securely against housing shoulder 33 as shown in Figures 2 and 3.

Back plate 37 may be provided with suitable spacer means such as the integrally formed projections or dimples 45 shown for maintaining the back plate and thermometer card 14 in mutually spaced relation and the card firmly pressed against the inner shoulders 32 of the housing. Suitable mounting means such as the keyhole slots 47 illustrated may be provided in back plate 37 for mounting the instrument to a wall or other selected support.

The thermometer card, back plate and housing arrangement just described is of particular advantage because of its structural simplicity, its better accuracy of reading due to the free suspension of the thermometer tube lower ends, and its inbuilt allowance for slight variations in dimensions of elements which permits use of a stamped back plate as opposed to the fitted plates required in prior constructions.

The inherent flexibility of the thermometer card 14 and back plate 37 permit the back plate projections 45 or such other spacer means as may be provided between the back plate and thermometer card to be made of a depth sufficient to assure that the entire periphery of the thermometer card always is held firmly against the inner shoulders 32 in housing 12 regardless of minor discrepancies in height of shoulders 32 and 33 due to manufacturing inaccuracies. This arrangement also provides greater ease of assembly by obviating the need for careful alignment of parts during assembly, and assures that card 14 will not loosen during the service life of the instrument.

Since the temperature sensitive bulb 20 of the indoor temperature thermometer tube 16 is suspended free of contact with housing 12, card 14 and back plate 37, maximum accuracy of indoor air temperature is obtained and little if any error of indication is introduced by contact of the bulb with its supporting structure.

As noted above, thermometer card 14 may include only a single scale of temperature indicia, these indicia preferably being located midway between the two thermometer tubes for maximum speed and convenience of temperature readings. As both thermometers are to read on this single scale it accordingly is necessary to correlate temperature sensitivities of the two thermometers, as by proper selection of thermometer tube bore sizes, bulb capacities and temperature sensitive fluids used. It generally is preferred for purpose of economy to utilize fluids of the same composition in both thermometer tubes, and since it is desirable that the remotely disposed bulb of the outdoor thermometer be of substantially greater size than the integral bulb of the indoor thermometer, it heretofore has not been possible to obtain equal indoor and outdoor temperature sensitivities for single scale indication using indoor and outdoor thermometer stem bores of substantially the same size, as in conventional indoor-outdoor thermometer constructions.

In accordance with the invention, equal temperature sensitivities of the indoor and outdoor thermometers are obtained by relating the cross-sectional areas of the indoor and outdoor thermometer tube bores correspondingly to the ratio of the volumetric capacities of their respective temperature sensing bulb assemblies, thus adjusting the sensitivity of the outdoor thermometer to the point where it is substantially equal to that of the indoor one.

Several unobvious advantages follow from use of the thermometer stem bore size relationship just described. Among these advantages is elimination of all need for stepping or counterboring the outdoor thermometer stem bore as has heretofore been necessary to accommodate the inserted end of the capillary tubing for the temperature sensing bulb assembly. According to the invention, the bores of both thermometer tubes may be uniform from end to end thereof, resulting in substantial savings in manufacturing cost. Other important advantages reside in the reduced errors in reading due to changes in length of capillary tubing exposed to outdoor temperatures, and in the broader angle and greater range of vision of the instrument and greater tolerance of alignment of the thermometer tubes with respect to the associated magnifying elements now to be described.

As shown in Figure 3, the indoor thermometer tube preferably is of the lens type having a generally triangular cross-section with a lens front which provides a substantial degree of lateral magnification of the fluid column within the tube when viewed parallel to the altitude of the triangular section, thus facilitating observation of fluid column height. In accordance with the invention, the tube 16 is canted about its longitudinal axis so that the altitude of the triangular section or lens front is tilted slightly with respect to a normal to the back plate 37 to which the tube is mounted, thus assuring that greatest magnification and best vision of the tube will be obtained when the viewer stands a normal distance from the instrument and somewhat along a perpendicular from approximately the center of the back plate. Thermometer tube 16 may conveniently be fixed in such canted position by proper shaping of its mounting staples 35 as shown.

Outdoor thermometer tube 18 preferably is although not necessarily provided with similar in-built magnification means and may if desired be canted similarly but oppositely to the indoor tube, though because of its substantially wider bore the exact alignment of the outdoor thermometer tube is not critical. Therefore, if the indoor thermometer tube has been properly aligned, both tubes may easily be viewed from directly in front of the instrument regardless of whether the outdoor tube is or is not similarly accurately aligned.

The magnification in-built into the thermometer tubes may if desired be supplemented by cylindrical magnifying lens surfaces formed in the transparent front wall 25 of casing 12 as illustrated in Figure 3. As there shown, the casing is shaped in cross-section to provide a predetermined degree of lateral magnification of the centrally disposed scale of temperature graduations for the thermometer tubes, and a greater degree of lateral magnification of the thermometer tubes proper. The exact shape of these magnifying strips necessary to provide the desired different degrees of magnification may readily be determined from well known principles of geometrical optics, as will be understood by those skilled in the art. If desired, only the front surface of casing wall 25 may be made convexly curved, the back surface being made plane as shown in the above mentioned Patent No. 2,460,051 to Welch.

Preferably, both thermometer tubes are provided with the conventional white background strip (not shown) running along the rear of the tubes for enhancing visibility of the fluid columns therein.

Turning now to preferred constructions of the outdoor temperature sensing bulb assembly and its capillary tubing and tubing connections into the bulb and thermometer tube, Figure 4 illustrates one form of metal capillary tubing 24 and shows its attachment into the thermometer stem 18. As shown, the thermometer tube bore 53 may in accordance with the invention be of uniform diameter along the entire length thereof, thus avoiding the stepped bores and attendant high cost of previous constructions.

Capillary tubing 55 in Figure 5 preferably is thin-walled stainless steel which I have found need not be armored as is the case with the prior copper tubing which is armored as by a braided metal sheath 57 for protection against collapse due to sharp bending or other cause. Use of stainless steel capillary tubing with the improved plastic metal to glass seal accordingly results in a substantial cost reduction in remote indicating thermometer elements over the prior elements utilizing armored copper tubing. The tubing preferably has an outside diameter such that it fits loosely within the bore 53 of stem 18, and is cemented and sealed into the bore by a body of settable plastic cement indicated at 59 in Figure 4 as will hereinafter be more fully described. A coil spring 61 may be fitted over the end of thermometer stem 18 as shown and bonded to the stem and to a portion of the length of the tubing 55 or its braided sheath 57 when used, by the settable plastic cement 59, thus substantially strengthening and reinforcing the joint between the stem and tubing. Spring 61 also serves to resist excessively sharp bending of the capillary tubing with consequent collapse thereof particularly at the point at which the tubing enters the stem.

While spring 61 provides these important advantages in the structure just described, its presence is not essential and if desired it may be omitted. An adequately strong bond and seal between the stem and tubing will be obtained even in the absence of spring 61, using plastic cements of the type and in the manner now to be described.

The cement used may be any thermoplastic, thermosetting or catalyst setting plastic capable of securely bonding both to metal and to glass, to provide a mechanically strong bond and fluid tight seal between such materials. I have found particularly suitable, however, the epoxy resin type plastics identified as "A-2" and "X-2" and sold by Armstrong Products Company, which identifies these plastics as being two-component systems consisting of an epoxy resin formulation and an amine type catalyst, one or both these components having admixed therein a frit or other inorganic filler. Preferably, relatively high percentages of such inorganic filler are included in the plastic as used in the present application, since this provides stronger bonds between the metal tubing and thermometer stems.

In use, the components of the plastic are mixed to form a watery substance which readily flows into the small space between the loosely fitting metal tubing and thermometer stem, which preferably are thoroughly precleaned and degreased as by suitable solvents or other cleansing or etching agents before assembly. The plastic wets the opposing surfaces of the thermometer stem and tubing, fills any space between these elements and hardens almost to ceramic consistency when properly cured at room or elevated temperatures, the exact details of the curing process depending on the particular plastic formulation employed. Sufficient of the plastic also is distributed over the exterior of the thermometer stem and tubing ends and over tubing sheath 57 and spring 61 to securely bond together all these elements and thus greatly enhance the strength of the stem to tubing area.

The glass-to-metal bond obtained in this manner is good up to about 180° F. and above, and while bond strength may decrease slightly at these higher temperatures this is relatively unimportant since such temperatures are seldom if ever encountered in normal service use.

Capillary tubing 55 is sealed at its end remote from thermometer stem 18 into a temperature sensing bulb assembly one form of which is illustrated in the exploded view of Figure 5. As there shown, the bulb assembly 63 may comprise a hollow glass bulb 65, a coil spring 67 similar in purpose and structure to spring 61 described above, and a heat conductive metal capsule or sheath 69 of a size to fit over bulb 65 for protecting it against breakage and improving its time of response to temperature change.

Tubing 55 and its protective sheath 57, and bulb 65 and spring 67 may be interfitted and securely bonded together by use of a plastic cement of the type and in the manner described above in reference to attachment of the tubing into the thermometer stem. Preferably the end of capsule 69 through which the tubing projects also is bonded thereto and to the tubing sheath and spring by plastic cement distributed over these elements. The other end of capsule 69 may be plugged and bulb 65 securely fixed in position in the capsule by a quantity of plastic poured or otherwise placed in the open end of the capsule after assembly and there permitted to harden.

I have found that equally good bonds between stainless steel tubing and glass thermometer stems or bulbs may be obtained as with copper tubing, and as hereinbefore pointed out, since the stainless steel tubing has much greater mechanical strength than copper, it presents very satisfactory resistance to collapse and other injury without use of any protective sheath or armor such as that illustrated in Figures 1–5, for example.

Tubing of the unarmored type just described is illustrated in Figure 6, wherein the capillary tubing 71 is of stainless steel and as shown is unarmored throughout its length. Figure 6 also illustrates a modified form of attachment of the tubing end into either the thermometer stem or temperature sensing bulb, the latter being specifically shown.

In Figure 6, coil springs such as shown at 61 and 67 in Figures 4 and 5 for reinforcing the tubing joint are omitted, a simple cap fitting 73 being instead used if necessary for joint reinforcement. This cap fitting is bonded to tubing 71 and to the glass bulb 75 and its enclosing capsule 77 by plastic cementing in a manner similar to that described above, the open end of capsule 77 then being plugged by plastic as also described in the foregoing.

Tubing to bulb joints utilizing plastic bonding agents in accordance with the invention also may be effected using metal bulbs, though in view of the better accuracy and reproducibility of readings provided by glass bulbs these generally are preferred. If for economy or other reasons metal bulbs are to be used, however, good bulb to tubing joints may be easily and economically obtained simply by flowing a plastic composition as described above over and into the tubing to bulb joint and permitting the plastic to harden.

Such an arrangement is illustrated in Figure 7, wherein a length of capillary tubing 79 preferably fabricated of stainless steel is inserted and sealed into the neck of a metal bulb 81, also preferably of stainless steel, by a body of plastic cement 83. If desired, a cap fitting such as shown at 73 in Figure 6 may be included for reinforcing the tubing to bulb joint thus provided.

As is apparent from the foregoing, the indoor-outdoor thermometers of the present invention present the important advantages of simplicity of structure, ease and economy of manufacture, good accuracy of temperature indication and long expected service life. While the invention has been specifically described with reference to indoor-outdoor thermometers, it will be understood that in many of its aspects the invention is equally applicable to other plural temperature thermometers, remote reading thermometers and temperature measuring devices generally.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an indoor-outdoor thermometer, a casing comprising an elongate body of transparent plastic material having in its rear side a cavity extending for the major portion of the length thereof and having rearwardly extending side walls, the walls having adjacent the rear edges thereof inner and outer shoulders, a card supported on said inner shoulders in a predetermined position in said cavity and bearing a longitudinal series of temperature indications centrally thereof, a pair of thermometer tubes supported in fixed relation one on either side of said series of temperature indications whereby both said tubes may be read on said one series of temperature indications, one of said tubes being a small bore tube having an integral bulb of relatively small volumetric capacity at one end thereof and the other of said tubes being a large bore tube adapted to receive in the bore thereof one end of a capillary tubing connected at its other end to a remotely located temperature sensing bulb of relatively large volumetric capacity, and a closure for the rear portion of said cavity supported on said outer shoulders and having a plurality of spaced projections engaging said card to maintain the card and closure in spaced relation and the card firmly pressed against said inner shoulders, said body having its front portion shaped to provide magnification of said thermometer tubes.

2. The thermometer defined in claim 1 wherein said body is shaped to provide a magnifying surface fronting said tubes and card and extending substantially the length of the series of temperature indications on said card, said magnifying surface comprising a central portion of predetermined magnifying power positioned in front of said temperature indications and portions of greater magnifying power located one on either side of said central portion and fronting each of said thermometer tubes.

3. The thermometer defined in claim 1 wherein at least one of said thermometer tubes is of such form in cross section as to provide magnification of the liquid column therein when viewed along at least one predetermined line, said one tube being mounted to said card with said predetermined line of view disposed at an angle with respect to a normal to said card.

4. In an indoor-outdoor thermometer, a casing comprising an elongate body of transparent plastic material having in its rear side a cavity extending for the major portion of the length thereof and having rearwardly extending side walls, the walls having adjacent the rear edges thereof a shoulder, a card supported on said shoulder in a predetermined position in said cavity and bearing a longitudinal series of temperature indications centrally thereof, a pair of thermometer tubes mounted in fixed relation one on either side of said series of temperature indications whereby both said tubes may be read on said one series of temperature indications, one of said tubes being a small bore tube with an integral bulb of relatively small volumetric capacity at one end thereof and the other of said tubes being a large bore tube adapted to receive in the bore thereof one end of a capillary tubing connected at its other end to a remotely located temperature sensing bulb of relatively large volumetric capacity, and closure means for the rear portion of said cavity supported on said casing and having a plurality of spaced projections engaging said card to maintain the card and closure in spaced relation and the card firmly pressed against said shoulder, said body having its front portion shaped to provide magnification of said thermometer tubes.

5. A plural temperature thermometer having first and second thermometer elements mounted on a scale plate having a single temperature scale common to both of said tubes, said first thermometer element comprising a first glass tube having an internal bore and a connecting bulb formed integrally therewith, said second thermometer element comprising a second glass tube having an internal bore open at one end, a flexible capillary metal tubing sealingly secured at one end in said open end of said second glass tube, and a bulb sealingly secured on the other end of said flexible capillary metal tubing, the volumetric capacity of the bulb for said second thermometer element being substantially greater than that of the first thermometer bulb and the cross-sectional area of the tube bore of said second thermometer element being correspondingly greater than that of the first thermometer element whereby said first and second thermometer elements have substantially equal temperature sensitivities.

6. A plurality temperature thermometer having first and second thermometer elements, said first thermometer element comprising a first glass tube having an internal more and a connecting bulb formed integrally therewith, a second thermometer element comprising a second glass tube having an internal bore having a uniform diameter from end to end and open at one end thereof, a flexible capillary tubing having an outside diameter substantially equal to the diameter of the internal bore of said second thermometer tube and sealingly secured in the bore in said one end of said second thermometer tube, a temperature sensing bulb connected to said capillary tubing, the volumetric capacity of the bulb for said second thermometer element being substantially greater than that of the first thermometer bulb and the cross-sectional area of the tube bore of said second thermometer tube being correspondingly greater than that of the first thermometer tube whereby said first and second thermometer elements have substantially equal temperature sensitivities, and means for supporting said first and second thermometer tubes in a side by side position to use a common scale of temperature.

7. In a plural temperature thermometer, a first thermometer element including a first tube having an internal bore and a connecting bulb, a second thermometer element including a second tube having an internal bore in fluid communication with a remotely disposed bulb through a length of connecting capillary tubing sealed at one end to said second tube and at the other end of said bulb, the volumetric capacity of the bulb of said second thermometer being substantially greater than that of the first thermometer bulb and the cross-sectional area of the tube bore of said second thermometer being correspondingly greater than that of the first thermometer whereby said first and second thermometers have substantially equal temperature sensitivities, and a single temperature scale on which both said thermometers are readable.

8. The plural temperature thermometer defined in claim 7 wherein said first thermometer tube includes magnifying means providing greatest magnification along a line canted with respect to the perpendicular to a line joining said tubes.

9. The plural temperature thermometer defined in claim 8 including casing means enclosing said thermometer tubes and providing a plurality of magnifying elements one disposed over each of said tubes.

10. The plural temperature thermometer defined in claim 7 wherein said second tube and the remotely disposed bulb are both of glass.

References Cited in the file of this patent

UNITED STATES PATENTS

| | | |
|---|---|---|
| 523,305 | Criggal | July 17, 1894 |
| 1,081,139 | Parliman | Dec. 9, 1913 |
| 1,232,074 | Norwood | July 3, 1917 |
| 1,691,136 | Schlaich | Nov. 13, 1928 |
| 1,811,190 | Tate | June 23, 1931 |
| 1,851,083 | Brown | Mar. 29, 1932 |
| 1,970,715 | Tate | Aug. 21, 1934 |
| 2,021,283 | Bolton | Nov. 19, 1935 |
| 2,053,765 | Dana | Sept. 8, 1936 |
| 2,147,021 | Ford | Feb. 14, 1939 |
| 2,415,309 | Stone | Feb. 4, 1947 |
| 2,431,805 | Kahl | Dec. 2, 1947 |
| 2,460,051 | Welch | Jan. 25, 1949 |
| 2,535,629 | Fairchild | Dec. 26, 1950 |
| 2,666,328 | Beck | Jan. 19, 1954 |
| 2,725,748 | Liberatore | Dec. 6, 1955 |

FOREIGN PATENTS

| | | |
|---|---|---|
| 820,078 | Germany | Nov. 8, 1951 |

Disclaimer 2,846,881.—*John L. Hobin*, Springfield, Ohio. THERMOMETER CONSTRUCTION. Patent dated August 12, 1958. Disclaimer filed July 21, 1961, by the assignee, *Springfield-Greene Industries, Inc.*

Hereby enters this disclaimer to claims 5 and 7 of said patent.
[*Official Gazette August 22, 1961.*]